(No Model.) 2 Sheets—Sheet 1.

E. B. TOWL.
HAY RAKE AND LOADER.

No. 277,174. Patented May 8, 1883.

(No Model.) 2 Sheets—Sheet 2.

E. B. TOWL.
HAY RAKE AND LOADER.

No. 277,174. Patented May 8, 1883.

Witnesses,
Geo. H. Strong
J. H. Krause

Inventor,
E. B. Towl
By Dewey & Co.
Attorneys

UNITED STATES PATENT OFFICE.

EBENEZER B. TOWL, OF FRANKTOWN, NEVADA.

HAY RAKE AND LOADER.

SPECIFICATION forming part of Letters Patent No. 277,174, dated May 8, 1883.

Application filed September 18, 1882. (No model.)

*To all whom it may concern:*

Be it known that I, EBENEZER B. TOWL, of Franktown, county of Washoe, State of Nevada, have invented an Improved Hay-Loader; and I hereby declare the following to be a full, clear, and exact description thereof.

My invention relates to a new and useful hay-loader; and it consists in a wheeled frame adapted to be attached behind a wagon and provided with a peculiar directing-apron, in which a novel toothed cylinder revolves, and from which a traveling draper extends to the wagon, whereby the hay is picked up from the ground, elevated to the draper, and by it carried to the wagon.

It also consists in minor details of construction, by which the parts mentioned are made to operate to an advantage.

The object of my invention is to provide a simple and effective machine to load hay upon a wagon to which it is attached and which it follows.

Figure 1:
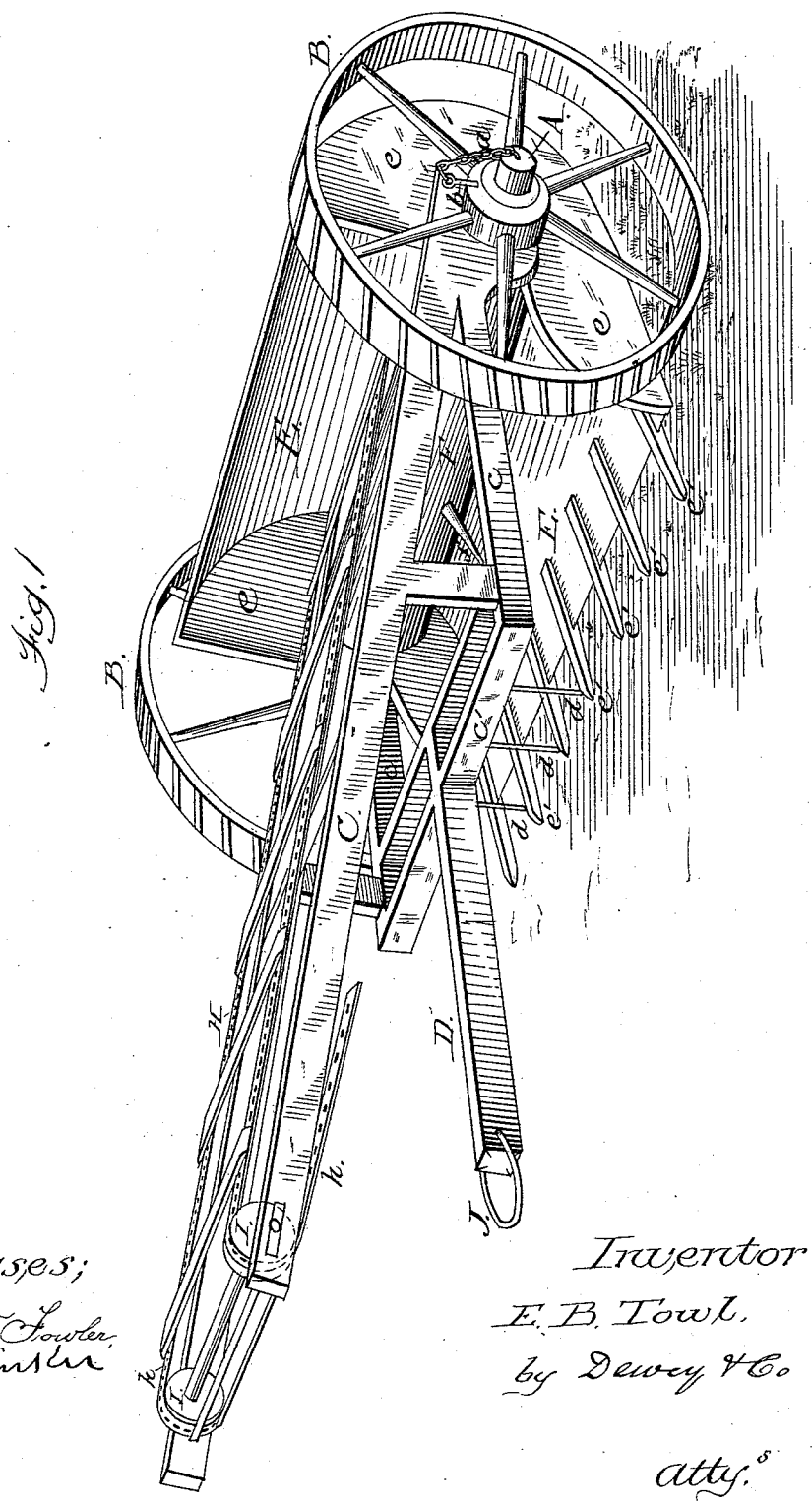
Figure 2:
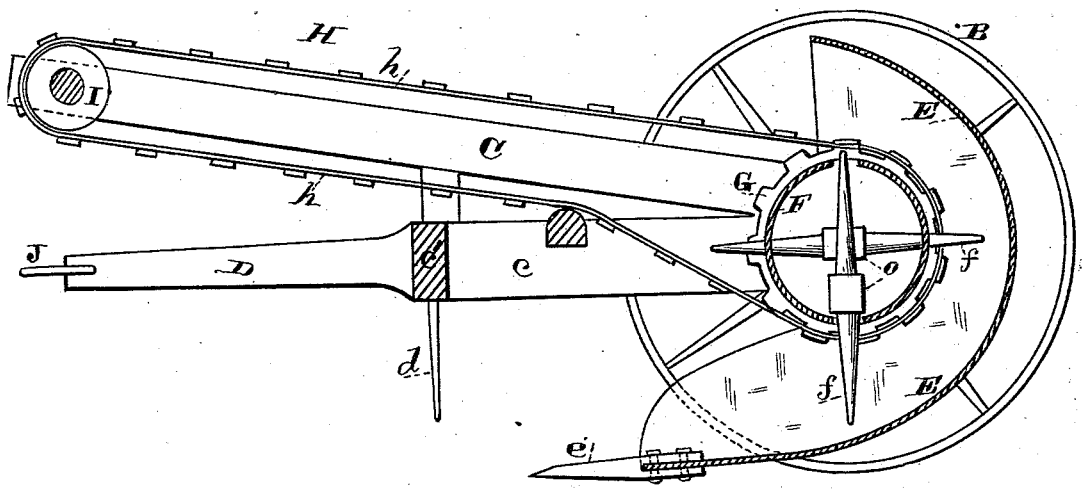
Figure 3:
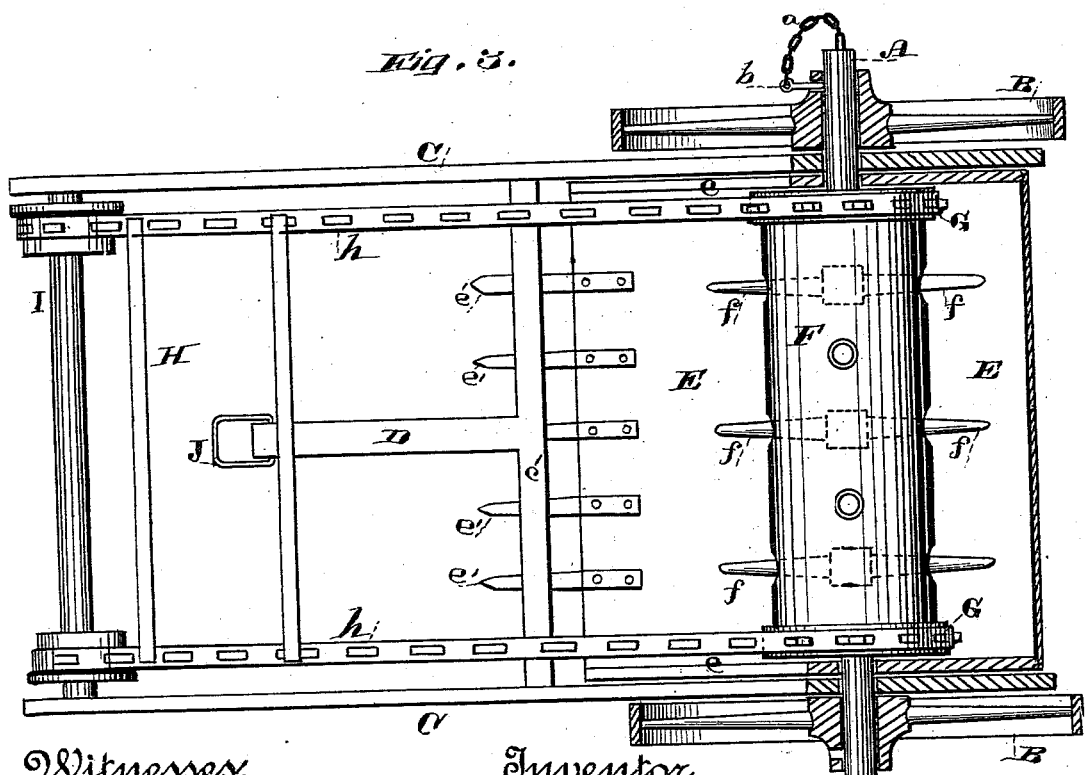

Referring to the accompanying drawings, Figure 1 is a perspective view of my device. Fig. 2 is a vertical longitudinal section. Fig. 3 is a plan, looking down.

Let A represent short axles having loosely journaled upon them wheels B, the faces of which are ribbed, as shown, as in a harvester, to increase traction, for the purpose hereinafter described. These wheels are adapted in any suitable manner, as by keys $b$, to be rigidly secured to the axles when desired. The keys $b$ are hung by short chains $a$ to the end of the axles to prevent them from being mislaid. Upon the axles, just inside of the wheels, is loosely journaled a frame, C, having short under strips, $c$, with cross-bars $c'$, to which the tongue D is secured. Extending downwardly from one of the cross-bars $c'$ are teeth $d$.

E is a curved directing-rake, the sides $e$ of which are loosely fitted upon axles A. The rake lies flat upon the ground at its forward edge, and thence curves backward and upward behind and over the end of the machine, as shown. Its lower edge is provided with horizontal teeth $e'$.

Between and upon the inner ends of the axles, inside of the sides $e$ of the rake E, is fixed a cylinder, F, which has at each end sprocket-pulleys G. This cylinder is secured to the axles, all forming practically a single axle. The same result could be had by passing an axle through and fixing the cylinder upon it.

H is a draper or carrier-belt, the outer edges, $h$, of which are perforated to fit over the sprocket-pulleys. The draper passes around behind the cylinder F and over a drum or roller, I, in the end of the frame C. The cylinder F is provided with a number of teeth, $f$. These fit loosely through the cylinder and extend on each side. They have an enlarged center, $o$, shorter than the inner diameter of the cylinder, so that they may have a certain play within the cylinder, though prevented from completely falling out. When the cylinder revolves, the teeth by their own weight drop down, extending one end as far out as their centers $o$ will permit, and withdrawing their other end into the cylinder. The end of the tongue is provided with a clevis, J, which is intended to fit over a hook in the back of the wagon. The traveling draper is to be suitably inclosed by side-boards to prevent the wind from blowing the hay off.

The operation of my device is as follows: Being hooked on behind the wagon and the end of frame C supported thereon, it is drawn with it, and from the wheels, which are then keyed to the axles, motion is transmitted through the axles and sprocket-pulleys G to the draper H, the upper surface of which is caused to travel up to the wagon. The directing-rake E being loose upon the axles, its lower edge travels along the surface of the ground and its teeth $e'$ pick up the hay, which thus is directed upon the rake E. The teeth will not stick in the ground or become clogged, but will lie flat. The cylinder F, being part of or fixed to the axles, is caused to revolve. The teeth $f$, as they come down, drop out to their extent and feed the hay along the rake to the draper, by which time they will be near the top, and will drop in out of the way, releasing the hay, which is thence carried up by the draper and deposited in the wagon. The operation is going on while the device is traveling, and the teeth $f$ are always dropping down to feed the hay along the rake to the draper, and then dropping in out of the way at the top.

The object of the teeth *d* under the cross-bar *c* is this: When hay is to be taken from a cock these teeth come in contact with the top of the cock and carry the hay forward to spread it out upon the ground in a sufficiently thin layer to allow the teeth to handle it without clogging the rake.

To provide for a greater working capacity I need only widen the throat of the directing-rake E. This can be done by providing its sides *e* with adjustable boxes, so that the rake may be moved back away from the cylinder F.

The roller or drum I is preferably made adjustable by being journaled in slots in the end of the frame C and secured in position by set-screws. This provides for the tightening of the draper.

When the device has to be transported and it is not desirable to transmit the motion of the wheels to the draper, I unkey them from the axles, when they will not affect the other parts.

Having thus described my invention, what I claim as new, and desire to secure by Letters Patent, is—

1. In a hay-loader having axle and wheels, the curved directing-rake E, having teeth $e'$, said rake being loosely journaled on the axle and curving under and up behind it, as shown, in combination with a traveling draper for receiving and conveying the hay from the rake, substantially as herein described.

2. In a hay-loader having an axle, wheels, and curved directing-rake E, the perforated cylinder F on said axle, having teeth $f$, with enlarged centers *o*, fitted loosely therein, and adapted by their own gravity to extend or withdraw their points through or from the circumference of said cylinder, substantially as herein described.

3. In a hay-loader, the rake E, having teeth $e'$, in combination with the swinging frame C, under strips, *c*, cross-bar $c'$, and the teeth *d*, extending down from the cross-bar $c'$, substantially as and for the purpose herein described.

In witness whereof I hereunto set my hand.

EBENEZER B. TOWL.

Witnesses:
J. E. DEWEY,
S. F. SWIFT.